US 8,385,416 B2

(12) United States Patent
Lu et al.

(10) Patent No.: US 8,385,416 B2
(45) Date of Patent: Feb. 26, 2013

(54) METHOD AND APPARATUS FOR FAST MODE DECISION FOR INTERFRAMES (75) Inventors: Xiaoan Lu, Plainsboro, NJ (US); Alexandros Tourapis, Burbank, CA (US); Jill MacDonald Boyce, Manalapan, NJ (US); Peng Yin, West Windsor, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1463 days.

(21) Appl. No.: 11/662,505

(22) PCT Filed: Sep. 14, 2005

(86) PCT No.: PCT/US2005/032734

§ 371 (c)(1),
(2), (4) Date: Mar. 12, 2007

(87) PCT Pub. No.: WO2006/033916

PCT Pub. Date: Mar. 30, 2006

(65) Prior Publication Data
US 2008/0117976 A1 May 22, 2008

Related U.S. Application Data (60) Provisional application No. 60/610,278, filed on Sep. 16, 2004.

(51) Int. Cl.
*H04N 7/12* (2006.01)
(52) U.S. Cl. ......... 375/240.14; 375/240.16; 375/240.24; 375/240.12; 382/166; 382/278; 382/296; 382/250; 382/251
(58) Field of Classification Search ............ 375/240.16, 375/240.24, 240.12; 382/166, 278, 296, 382/250–251
See application file for complete search history.

(56) References Cited

U.S. PATENT DOCUMENTS

| | | | |
|---|---|---|---|
| 6,037,987 A * | 3/2000 | Sethuraman | 375/240.03 |
| 6,507,616 B1 | 1/2003 | Ryu | |
| 6,600,836 B1 | 7/2003 | Thyagarajan et al. | |
| 6,633,611 B2 * | 10/2003 | Sekiguchi et al. | 375/240.16 |
| 2002/0094028 A1 | 7/2002 | Kimoto | |
| 2004/0131121 A1 | 7/2004 | Dumitras et al. | |
| 2004/0218674 A1* | 11/2004 | Kondo et al. | 375/240.16 |

(Continued)

FOREIGN PATENT DOCUMENTS

| | | |
|---|---|---|
| EP | 0933948 A2 | 1/1999 |
| EP | 1429564 A1 | 8/2002 |

(Continued)

OTHER PUBLICATIONS

Adaptive direction search algorithms based on motion correlation for block motion estimation Zhiru Shi; Fernando, W.A.C.; Kondoz, A. Consumer Electronics, IEEE Transactions on (0098-3063) 2011. vol. 57,Iss.3;p. 1354-1361.*

(Continued)

*Primary Examiner* — Thanhnga B Truong
*Assistant Examiner* — Angela Holmes
(74) *Attorney, Agent, or Firm* — Robert D. Shedd; Guy H. Eriksen (57) ABSTRACT

There is disclosed a video encoder and corresponding method for encoding video data for an image block. The video encoder performs a mode decision by performing initial motion estimation on only a subset of possible block sizes to output motion information corresponding thereto, and determining, based upon the motion information corresponding to only the subset of possible of block sizes and upon other image-related analysis data, whether other block sizes are to be evaluated.

21 Claims, 5 Drawing Sheets

U.S. PATENT DOCUMENTS

2006/0165170 A1* 7/2006 Kim et al. ............... 375/240.12
2006/0285594 A1* 12/2006 Kim et al. ............... 375/240.16

FOREIGN PATENT DOCUMENTS

| EP | 0933948 A2 | 1/2003 |
| JP | 2003-521178 | 7/2003 |
| WO | WO2004/064398 A1 | 7/2004 |
| WO | WO2004/080084 A1 | 9/2004 |

OTHER PUBLICATIONS

Fast Mode Decision for Scalable Video Coding with Spatial Scalability Kan Chang; Tuanfa Qin; Jiali Zheng. Wireless Communications, Networking and Mobile Computing (WiCOM), 2011 7th International Conference on (2161-9646) (978-1-4244-6250-6);2011. p. 1-4.*

Fast Mode Decision Based on Mode Adaptation Tiesong Zhao; Hanli Wang; Kwong, S.; Kuo, C.-C.J. Circuits and Systems for Video Technology, IEEE Transactions on (1051-8215) 2010. vol. 20,1ss. 5;p. 697-705.*

Chang A et al: Fast multi-block selection for H.264 video coding Circuits and Systems, 2004 ISCAS 04. Prodeedings of the 2004 International Symposium on Vancouver, BC, Canada May 23-26, 2004, Piscataway, NJ USA, IEEE, US, May 23, 2004, pp. III-817, XPO10719389 ISBN: 0-7803-8251-x pp. III-818, paragraph 3.

Yanfie Shen et. al: "Fast mode selection based on texture analysis and local motion activity in H.264/JVT" Communications, Circuits and Systems, 2004. ICCCAS 2004. 2004 International Conference on Chengdu, China Jun. 27-29, 2004, Piscataway, NJ USA, IEEE, US Jun. 27, 2004, pp. 539-542 vol. 1, XP010731803, ISBN: 0-7803-8647-7, p. 541, Paragraph III.

Tien-Ying Kuo et. al.: "Fast Macroblock Partition Prediction for H.264/AVC" Multimedia and Expo 2004. ICME 04. 2004 IEEE International Conference on Taipei, Taiwan Jun. 27-30, 2004, Piscataway, NJ, USA, IEEE vol. 1 Jun. 27, 2004, pp. 675-678 XPO10770901 ISBN: 0-7803-8603-5 p. 675, Paragraph 2.

Alexis Michael Tourapis et. al., "Fast Mode Discision and Motion Estimation for H.264 With a Focus on MPEG-2 H.264 Transcoding", May 26, 2005.

Search Report dated Jan. 3, 2006.

Lim, K.P. et al., "Fast Inter Mode Selection", Joint Video Team (JVT) of ISO/IEC MPEG & ITU-T VCEG (ISO/IEC JTC1/SC29/WG11 and ITU-T SG16 Q.6), 9$^{th}$ Meeting: San Diego, US, Sep. 2, 2003, JVT-I020, pp. 1-11.

Wu, D. et al., "Fast Inter Mode Decision With Adaptive Thresholds for H.264 Encoding", IEEE International Symposium on Consumer Electronics, IEEE, Sep. 1, 2004, pp. 406-409.

Wu, D. et al., "Block Inter Mode Decision for Fast Encoding of H.264", IEEE International Conference on Acoustics, Speech, and Signal Processing (ICASSP 2004), IEEE, May 2004, vol. 3, pp. 181-184.

Yu, A. C., Efficient Block-Size Selection Algorithm for Inter-Frame Coding in H.264/MPEG-4 AVC, IEEE International Conference on Acoustics, Speech, and Signal Processing (ICASSP 2004), IEEE, May 2004, vol. 3, pp. 169-172.

* cited by examiner

METHOD AND APPARATUS FOR FAST MODE DECISION FOR INTERFRAMES

CROSS-REFERENCE TO RELATED APPLICATIONS

This application claims the benefit, under 35 U.S.C. §365 of International Application PCT/US2005/032734, filed Sep. 14, 2005, which was published in accordance with PCT Article 21(2) on Mar. 30, 2006 in English and which claims the benefit of U.S. provisional patent application No. 60/610,278 filed Sep. 16, 2004.

FIELD OF THE INVENTION

The present invention relates generally to video encoders and, more particularly, to a method and apparatus for fast mode decision for interframes.

BACKGROUND OF THE INVENTION

Inter and intra coding methods can both be used to encode interframes in accordance with various video compression standards. Intra coding uses only spatial correlation while inter coding uses temporal correlation from previously coded frames. In general, inter coding is used for macroblocks that are well predicted from previous pictures, and intra coding is used for macroblocks that are not well predicted from previous pictures, or for macroblocks with low spatial activity.

Typically, an encoder makes an inter/intra coding decision for each macroblock based on coding efficiency and subjective quality considerations. In the JVT/H.264/MPEG AVC ("JVT") standard, inter coding allows various block partitions and multiple reference pictures to be used for predicting a 16×16 macroblock.

The JVT encoder uses tree-structured hierarchical macroblock partitions. Inter-coded 16×16 pixel macroblocks may be broken into macroblock partitions, of sizes 16×8, 8×16, or 8×8. Macroblock partitions of 8×8 pixels are also known as sub-macroblocks. Sub-macroblocks may be further broken into sub-macroblock partitions, of sizes 8×4, 4×8, and 4×4. An encoder may select how to divide the macroblock into partitions and sub-macroblock partitions based on the characteristics of a particular macroblock, in order to maximize compression efficiency and subjective quality.

Furthermore, JVT also supports INTRA, SKIP and DIRECT modes. Intra modes allow three types: INTRA4×4, INTRA16×16, and INTRA8×8 which is a Fidelity Range extensions mode only. INTRA4×4 and INTRA8×8 support 9 prediction modes: vertical; horizontal; DC, diagonal down/left; diagonal down/right; vertical-left; horizontal-down; vertical-right; and horizontal-up prediction. INTRA16×16 supports 4 prediction modes: vertical; horizontal; DC; and plane prediction.

Multiple reference pictures may be used for inter-prediction, with a reference picture index coded to indicate which of the multiple reference pictures is used. In P pictures (or P slices), only single directional prediction is used, and the allowable reference pictures are managed in list 0. In B pictures (or B slices), two lists of reference pictures are managed, list 0 and list 1. In B pictures (or B slices), single directional prediction using either list 0 or list 1 is allowed, or bi-prediction using both list 0 and list 1 is allowed. When bi-prediction is used, the list 0 and the list 1 predictors are averaged together to form a final predictor.

Each macroblock partition may have an independent reference picture index, prediction type (list 0, list 1, bipred), and an independent motion vector. Each sub-macroblock partition may have independent motion vectors, but all sub-macroblock partitions in the same sub-macroblock use the same reference picture index and prediction type.

For inter-coded macroblocks, besides the above macroblock partition, P frame also supports SKIP mode, while B frame supports both SKIP mode and DIRECT mode. In SKIP mode, no motion and residual information are encoded. The motion information for a SKIP macroblock is the same as a motion vector predictor specified by the picture/slice type (P or B), and other information such as sequence and slice level parameters, and is related to other temporally or spatial adjacent macroblocks and its own macroblock position within the slice. In contrast, in DIRECT mode, no motion information is encoded, but prediction residue is encoded. Both macroblocks and sub-macroblocks support DIRECT mode.

As for mode decision, inter pictures need to support both inter and intra modes. Intra modes include INTRA4×4 and INTRA16×16. For P pictures, inter modes include SKIP and 16×16, 16×8, 8×16 and sub-macroblock 8×8 partitions. 8×8 further supports 8×8, 8×4, 4×8 and 4×4 partitions. For B pictures, both list 0 and list 1 and DIRECT mode are considered for both macroblocks and sub-macroblocks.

In the prior art, a Rate-Distortion Optimization (RDO) framework is used for mode decision. For inter modes, motion estimation is separately considered from mode decision. Motion estimation is first performed for all block types of inter modes, then the mode decision is made by comparing the cost of each inter mode and intra mode. The mode with the minimal cost is selected as the best mode.

A conventional procedure to encode one macroblock s in a P- or B-picture (hereinafter the "conventional macroblock encoding procedure") is summarized as follows.

In a first step of the conventional macroblock encoding procedure, given the last decoded pictures, we decide the Lagrangian multiplier $\lambda_{MODE}$, $\lambda_{MOTION}$, and the macroblock quantizer QP.

In a second step of the conventional macroblock encoding procedure, motion estimation and reference picture selection are performed by minimizing $$J(REF,m(REF)|\lambda_{MOTION})=SA(T)D(s,c(REF,m(REF)))+\lambda_{MOTION}(R(m(REF)-p(REF))+R(REF))$$

for each reference picture and motion vector of a possible macroblock mode. In the preceding equation, m is the current motion vector being considered, REF denotes the reference picture, p is the motion vector used for the prediction during motion vector coding, R(m−p) represents the bits used for coding motion vector and R(REF) is the bits for coding reference picture. SAD denotes the Sum of Absolute Differences between original signal and reference signal predicted by the motion vector.

In a third step of the conventional macroblock encoding procedure, the macroblock prediction mode is chosen by minimizing $$J(s,c,MODE|QP,\lambda_{MODE})=SSD(s,c,MODE|QP)+\lambda_{MODE}\cdot R(s,c,MODE|QP),$$

given QP and $\lambda_{MODE}$ when varying MODE. SSD denotes the Sum of Square Differences between the original signal and the reconstructed signal. R(s,c,MODE) is the number of bits associated with choosing MODE, including the bits for the macroblock header, the motion and all DCT coefficients. MODE indicates a mode out of the set of potential macroblock modes:

P-frame:

$$\text{MODE} \in \begin{Bmatrix} INTRA4\times 4,\ INTRA16\times 16,\ \text{SKIP}, \\ 16\times 16,\ 16\times 8,\ 8\times 16,\ 8\times 8,\ 8\times 4,\ 4\times 8,\ 4\times 4 \end{Bmatrix},$$

B-frame:

MODE ∈

$$\begin{Bmatrix} INTRA4\times 4,\ INTRA16\times 16,\ \text{DIRECT},\ \text{DIRECT}\_8\times 8 \\ L0\_16\times 16,\ L0\_16\times 8,\ L0\_8\times 16,\ L0\_8\times 8,\ L0\_8\times 4, \\ L0\_4\times 8,\ L0\_4\times 4,\ L1\_16\times 16,\ L1\_16\times 8,\ L1\_8\times 16, \\ L1\_8\times 8,\ L1\_8\times 4,\ L1\_4\times 8,\ L1\_4\times 4,\ Bi\_16\times 16, \\ Bi\_16\times 8,\ Bi\_8\times 16,\ Bi\_8\times 8,\ Bi\_8\times 4,\ Bi\_4\times 8,\ Bi\_4\times 4, \end{Bmatrix}.$$

The INTRA4×4 includes modes:

$$\text{MODE} \in \begin{Bmatrix} \text{vertical, horizontal, DC, diagonal} - \text{down/left, diagonal} - \\ \text{down/right, vertical} - \text{left, horizontal} - \text{down, vertical} - \\ \text{right, horizontal} - \text{up} \end{Bmatrix}$$

and INTRA16×16 includes modes: MODE ∈{vertical, horizontal, DC, plane}.

With respect to the conventional macroblock encoding procedure, a conventional fast mode selection was introduced which could considerably reduce the complexity of mode decision while having little impact in quality by considering that the mode decision error surface is more likely to be monotonic and therefore if certain modes are examined first it might be simpler to find the best mode. If mode decision for a given mode is not performed, then this essentially implies that motion estimation also is not performed, the latter being the most costly part of encoding even if a fast motion estimation algorithm is used. More specifically, in this approach SKIP and 16×16 modes were examined first. According to their distortion relationship (i.e. (J(SKIP)<J(16×16)) and the availability of residual, a further decision was made whether or not to terminate the search. Otherwise, J(8×8) and J(4×4) were also computed. Based on the relationship of J(16×16), J(8×8), and J(4×4), additional decisions were made to determine which of the remaining block sizes should be tested. For example, if the distortion is monotonic (i.e., J(16×16)>J(8×8)>J(4×4) or J(16×16)<J(8×8)<J(4×4)), then it can easily be determined which additional partitions should be examined. For the first case, for example, only small partitions (8×4 and 4×8) are tested, while in the second case only 16×8 and 8×16 are examined. If the distortion is not monotonic, then all possible modes are tested.

In a different conventional fast mode decision approach, additional conditions were introduced based on the distortion values (see FIG. 1 below) and the relationships between different modes (see FIG. 2 below), which allowed the search to terminate even faster without much impact in quality.

Figure 1:
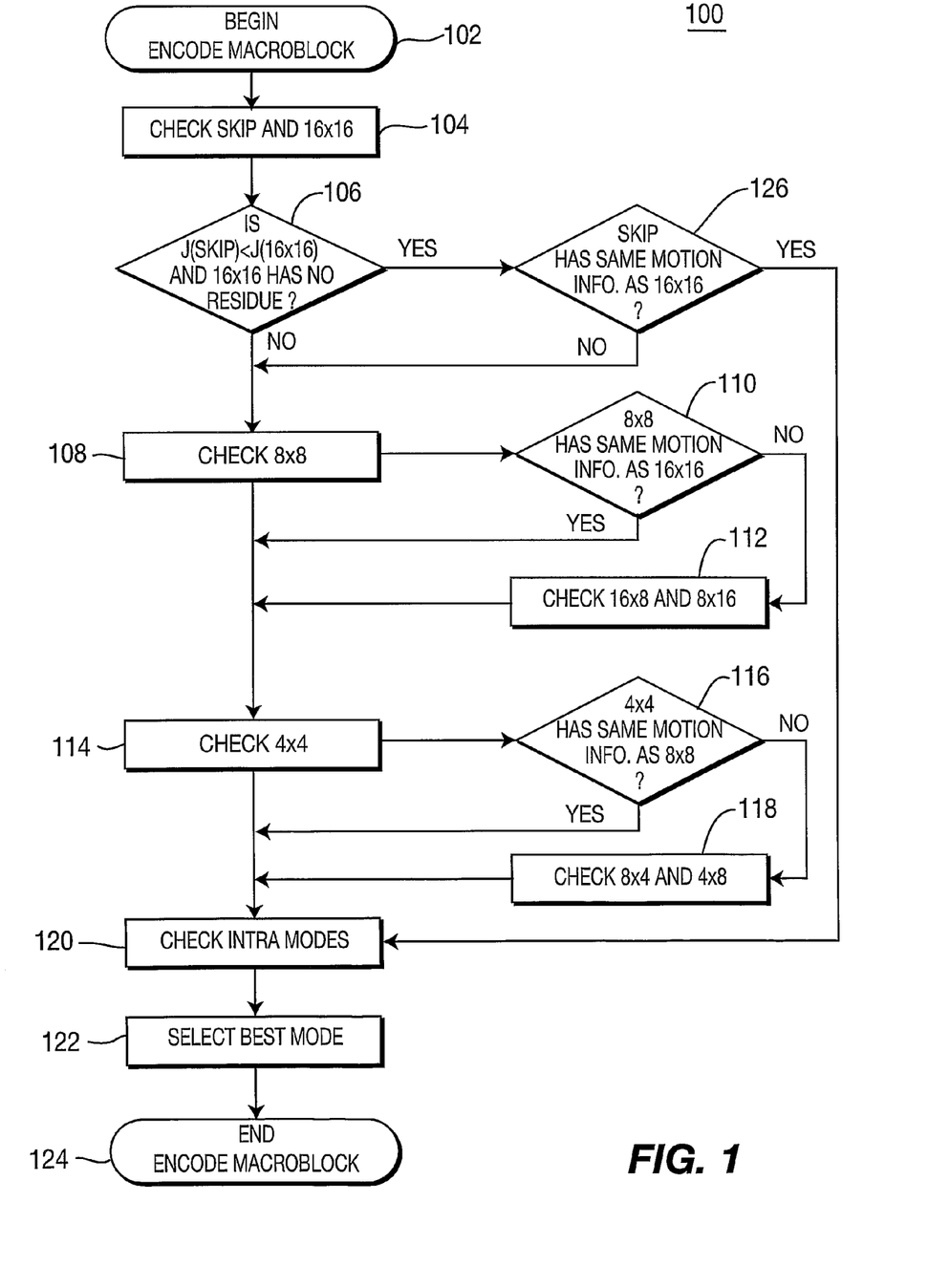
FIG. 1 shows a flow diagram for a method for motion vector and mode decision based on distortion values.

Turning to FIG. 1, a method for motion vector and mode decision based on distortion values is generally indicated using the reference numeral 100. The method 100 includes a start block 102 that passes control to a function block 104. The function block 104 checks SKIP mode and 16×16 mode, and passes control to a decision block 106. The decision block 106 determines whether or not the distortion in SKIP mode, J(SKIP), is less than the distortion in 16×16 mode, J(16×16), and whether or not 16×16 mode has any residue. If the distortion in SKIP mode is not less than the distortion in 16×16 mode and/or 16×16 mode has a residue, then control is passed to a function block 108. Otherwise, if the distortion in SKIP mode is less than the distortion in 16×16 mode and 16×16 mode has no residue, then control is passed to a decision block 126.

The function block 108 checks 8×8 mode for a current (i.e., currently evaluated) 8×8 sub-partition, and passes control to a decision block 110 and to a function block 114. The decision block 110 determines whether or not 8×8 mode has the same motion information as 16×16 mode for the current 8×8 sub-partition. If 8×8 mode does not have the same motion information as 16×16 mode for the subject sub-partition, then control is passed to a function block 112. Otherwise, if 8×8 mode has the same motion information as 16×16 mode for the current 8×8 sub-partition, then control is passed to a function block 114.

The function block 112 checks 16×8 and 8×16 sub-partitions, and passes control to function block 114.

The function block 114 checks 4×4 mode for a current 4×4 sub-partition, and passes control to a decision block 116 and to a function block 120. The decision block 116 determines whether or not 4×4 mode has the same motion information as 8×8 mode for the current 4×4 sub-partition. If 4×4 mode does not have the same motion information as 8×8 mode for the current 4×4 sub-partition, then control is passed to a function block 118. Otherwise, if 4×4 mode has the same motion information as 8×8 mode for the current 4×4 sub-partition, then control is passed to a function block 120.

The function block 118 checks 8×4 and 4×8 sub-partitions, and passes control to function block 120.

The function block 120 checks intra modes, and passes control to a function block 122. The function block 122 selects the best mode from among the evaluated modes, and passes control to an end block 124. The end block 124 ends the macroblock encoding.

The decision block 126 determines whether or not SKIP mode has the same motion information as 16×16 mode for a current (i.e., currently evaluated) 16×16 MB. If SKIP mode does not have the same motion information as 16×16 mode for the current 16×16 MB, then control is passed to decision block 108. Otherwise, if SKIP mode has the same motion information as 16×16 mode for the current 16×16 MB, then control is passed to function block 120.

Figure 2:
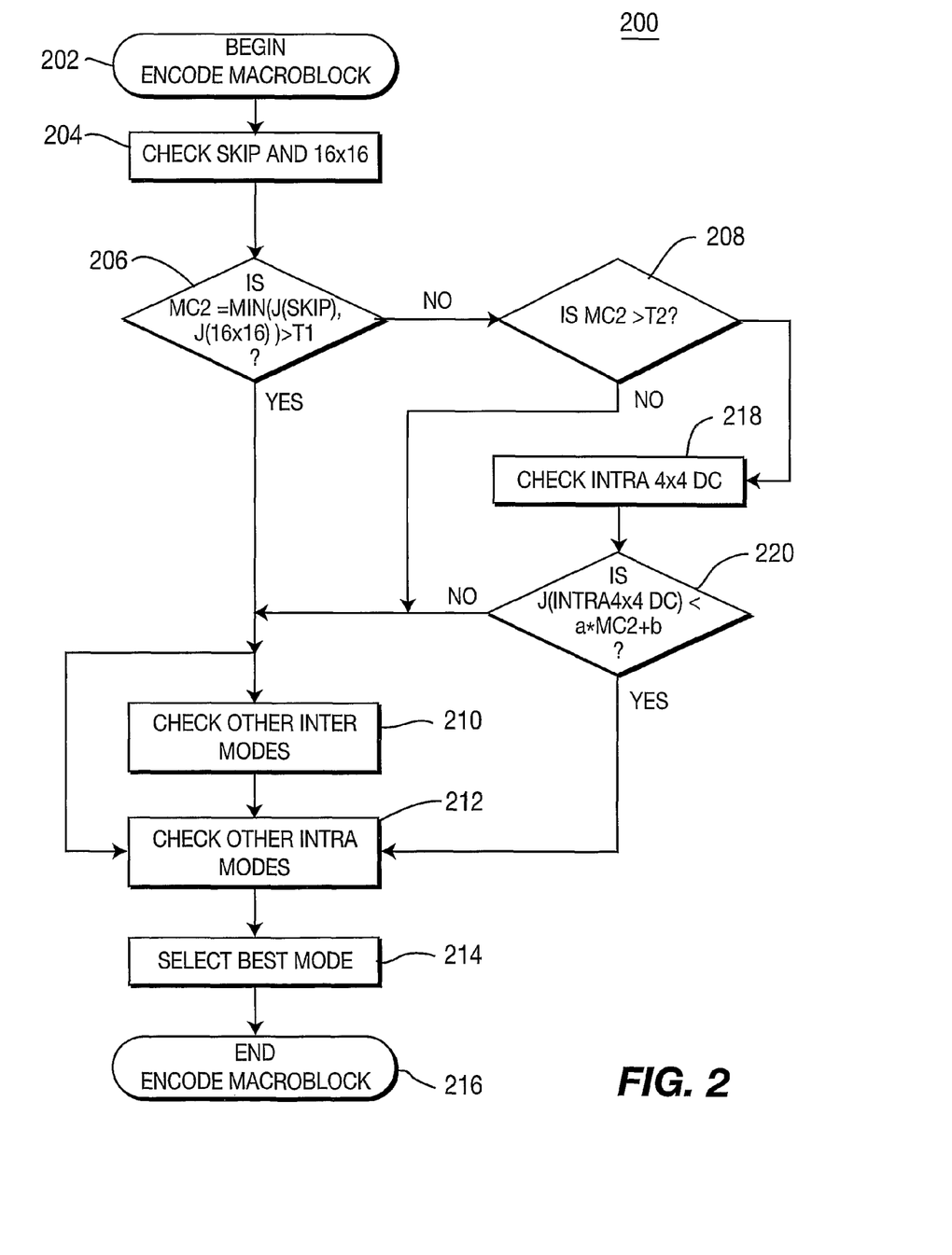
FIG. 2 shows a flow diagram for a method for motion vector and mode decision based on relationships between different modes.

Turning to FIG. 2, a method for motion vector and mode decision based on relationships between different modes is generally indicated using the reference numeral 200. The method 200 includes a start block 202 that passes control to a function block 204. The function block 204 checks SKIP mode and 16×16 mode, and passes control to a decision block 206. The decision block 206 determines whether or not MC2>T1, where MC2=min(J(SKIP), J(16×16)), the minimum distortion between SKIP mode and 16×16 mode, and T1 is the first threshold. If MC2<=T1, then control is passed to a decision block 208. Otherwise, if MC2>T1, then control is passed to a function block 210 and a function block 212.

The decision block 208 determines whether or not MC2 is greater than T2 (a second threshold). If MC2 is not greater than T2, then control is passed to function block 210 and function block 212. Otherwise, if MC2 is greater than T2, then control is passed to a function block 218.

The function block 210 checks other inter modes, and passes control to a function block 212. The function block 212 checks other non-tested intra modes, and passes control to a function block 214. The function block 214 selects the best mode from among the evaluated modes, and passes control to an end block 216. The end block 216 ends the macroblock encoding.

The function block 218 checks the intra4×4 DC, and passes control to a decision block 220. The decision block 220 determines whether or not J(INTRA4×4 DC) is less than a*MC2+b, where a and b are constants. If J(INTRA4×4 DC) is not less than a*MC2+b, then control is passed to function block 210 and function block 212. Otherwise, if J(INTRA4×4 DC) is less than a*MC2+b, then control is passed to the function block 212.

In another different conventional fast mode decision approach, a picture was first analyzed using simple methods such as homogeneity analysis and stationarity detection. Homogeneity analysis can be performed by considering simple statistical measurements such as standard deviation or variance, skewness and kyrtosis. Unfortunately, these metrics might not be as appropriate for real time implementations. The determination of which modes should be considered was also somewhat based on a yet different conventional approach using a fast intra decision and, in particular, relating to edge direction. A method relating to the approach that uses homogeneity analysis and stationarity detection can be seen in FIG. 3, where modes 16×16, 16×8, 8×16, 8×8, 8×4, 4×8, and 4×4 are sequentially assigned to modes 1 through 7.

Figure 3:
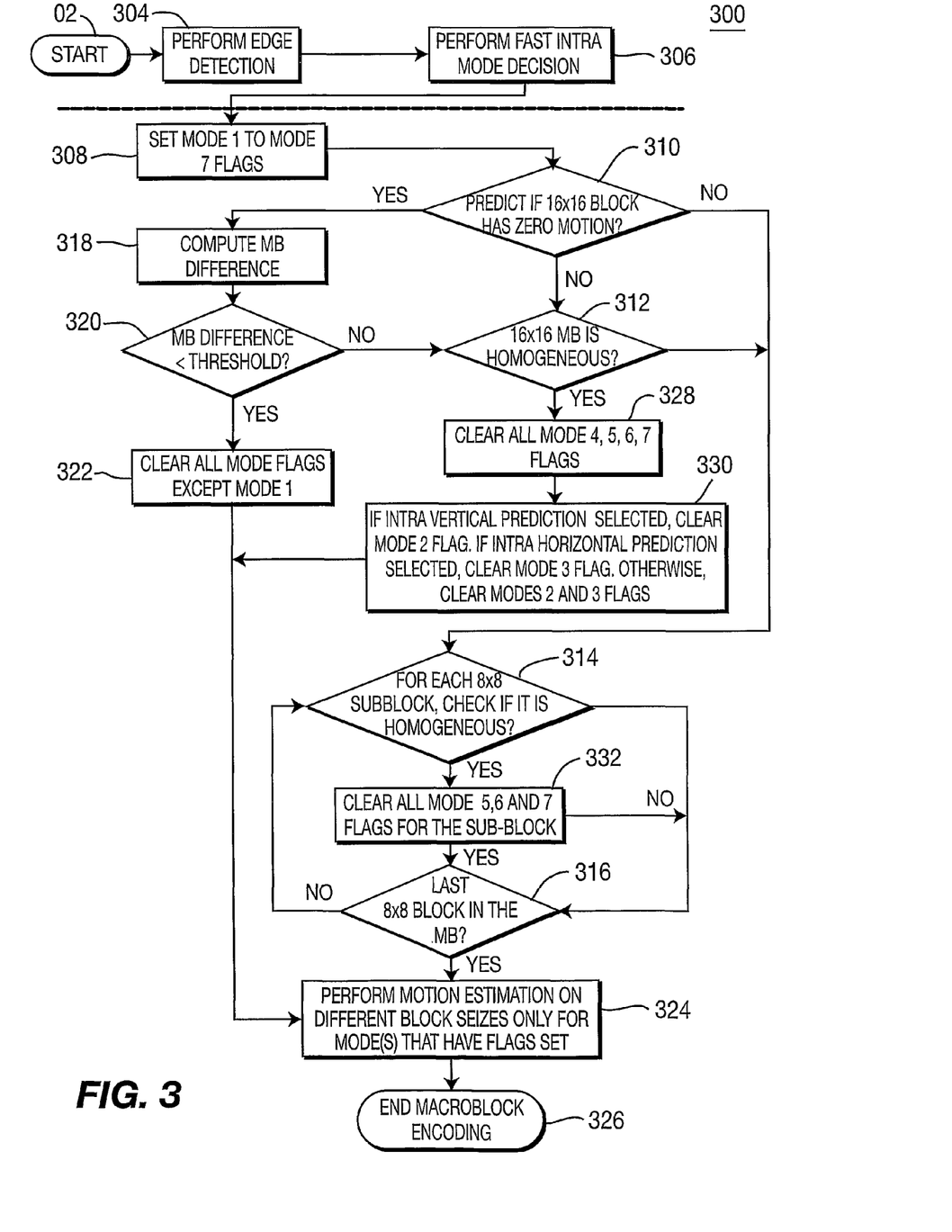
FIG. 3 shows a flow diagram for a method for mode decision using homogeneity and stationarity.

Turning to FIG. 3, a method for mode decision using homogeneity and stationarity is generally indicated using the reference numeral 300. The method 300 includes a start box 302 that passes control to a function block 304. The function block 304 performs edge detection, and passes control to a function block 306. The function block 306 performs fast intra mode decision, and passes control to a function block 308. The function block 308 sets mode 1 to mode 7 flags, and passes control to a decision block 310. The decision block 310 determines whether or not a subject (i.e., currently evaluated) 16×16 macroblock (MB) has zero motion. If the 16×16 MB does not have zero motion, then control is passed to a decision block 312. Otherwise, if the 16×16 MB does have zero motion, then control is passed to a function block 318.

The decision block 312 determines whether or not the 16×16 MB is homogenous. If the 16×16 MB is not homogenous, then control is passed to a decision block 314. Otherwise, if the 16×16 MB is homogenous, then control is passed to a function block 328.

The decision block 314 determines whether or not each 8×8 sub-block of the 16×16 block is homogenous. If each 8×8 sub-block is not homogenous, then control is passed to a decision block 316. Otherwise, if each 8×8 sub-block is homogenous, then control is passed to a function block 332.

The decision block 316 determines whether or not a subject 8×8 sub-block is the last sub-block in the 16×16 MB. If the 8×8 sub-block is not the last sub-block in the 16×16 MB, then control is returned to step 314. Otherwise, if the 8×8 sub-block is the last sub-block in the 16×16 MB, then control is passed to a function block 324. The function block 324 performs motion estimation on different block sizes only for modes that have set flags, and passes control to an end block 326. The end block 326 ends the macroblock encoding.

The function block 318 computes the MB difference, and passes control to a decision block 320. The decision block 320 determines whether or not the MB difference is less than a pre-specified threshold. If the MB difference is not less than a pre-specified threshold, then control is passed to step 312. Otherwise, if the MB difference is less than a pre-specified threshold, then control is passed to a function block 322.

The function block 322 clears all mode flags except mode 1, and passes control to the function block 324.

The function block 328 clears all mode 4, 5, 6, and 7 flags, and passes control to a function block 330. The function block 330 clears the mode 2 flag when intra vertical prediction is selected, clears the mode 3 flag when intra horizontal prediction is selected, otherwise clears modes 2 and 3, and then passes control to the function block 324.

The function block 332 clears the mode 5, 6, and 7 flags for the 8×8 sub-block, and passes control to the decision block 316.

Inter mode decision is associated with motion estimation, various block sizes and multiple reference picture selection. Intra mode decision is associated with various block types and multiple spatial prediction mode selection. Therefore, mode decision for interframes incurs a big burden on the encoder.

Accordingly, it would desirable and highly advantageous to have a method and apparatus for performing a fast mode decision for interframes that lessens the burden on the encoder.

SUMMARY OF THE INVENTION

These and other drawbacks and disadvantages of the prior art are addressed by the present invention, which is directed to a method and apparatus for fast mode decision for interframes.

According to an aspect of the present invention, there is provided a video encoder for encoding video data for an image block. The video encoder includes an encoder for performing a mode decision by performing initial motion estimation on only a subset of possible block sizes to output motion information corresponding thereto, and determining, based upon the motion information corresponding to only the subset of possible of block sizes and upon other image-related analysis data, whether other block sizes are to be evaluated.

According to another aspect of the present invention, there is provided a method for encoding video data for an image block. The method include the step of performing a mode decision by performing initial motion estimation on only a subset of possible block sizes to output motion information corresponding thereto, and determining, based upon the motion information corresponding to only the subset of possible of block sizes and upon other image-related analysis data, whether other block sizes are to be evaluated.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

The present invention is directed a method and apparatus for fast mode decision for interframes. Advantageously, the present invention reduces mode decision complexity, while at the same time maintaining coding efficiency, as compared to prior art approaches to fast mode decision for interframes.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Herein, a novel method and apparatus are provided that, in part, utilize certain aspects of conventional approaches in a novel combination to further reduce the complexity of mode decision. The present invention can provide an improvement in performance over related prior art approaches. For example, in one embodiment of the present invention, improved performance over related prior art approaches is achieved by considering the error surface monotonicity. Moreover, the present invention can provide an improvement in efficiency over related prior art approaches. For example, it is observed that in one related prior art approach that uses homogeneity conditions, all modes need to be checked if no homogeneity condition is satisfied. In contrast to that prior art approach, the present invention may examine first only 16×16, 8×8, and 4×4 modes, and check the appropriate modes based on, e.g., the conditions specified in another conventional approach and/or other conditions specified herein. An example of such an implementation can be seen in FIG. 5. It is to be noted that edge information is used for the mode decision, as this metric may be better for real-time implementations than metrics such as standard deviation or variance, skewness, and kyrtosis. Of course, these and other metrics may also be employed by the present invention, while maintaining the scope of the present invention.

Figure 4:
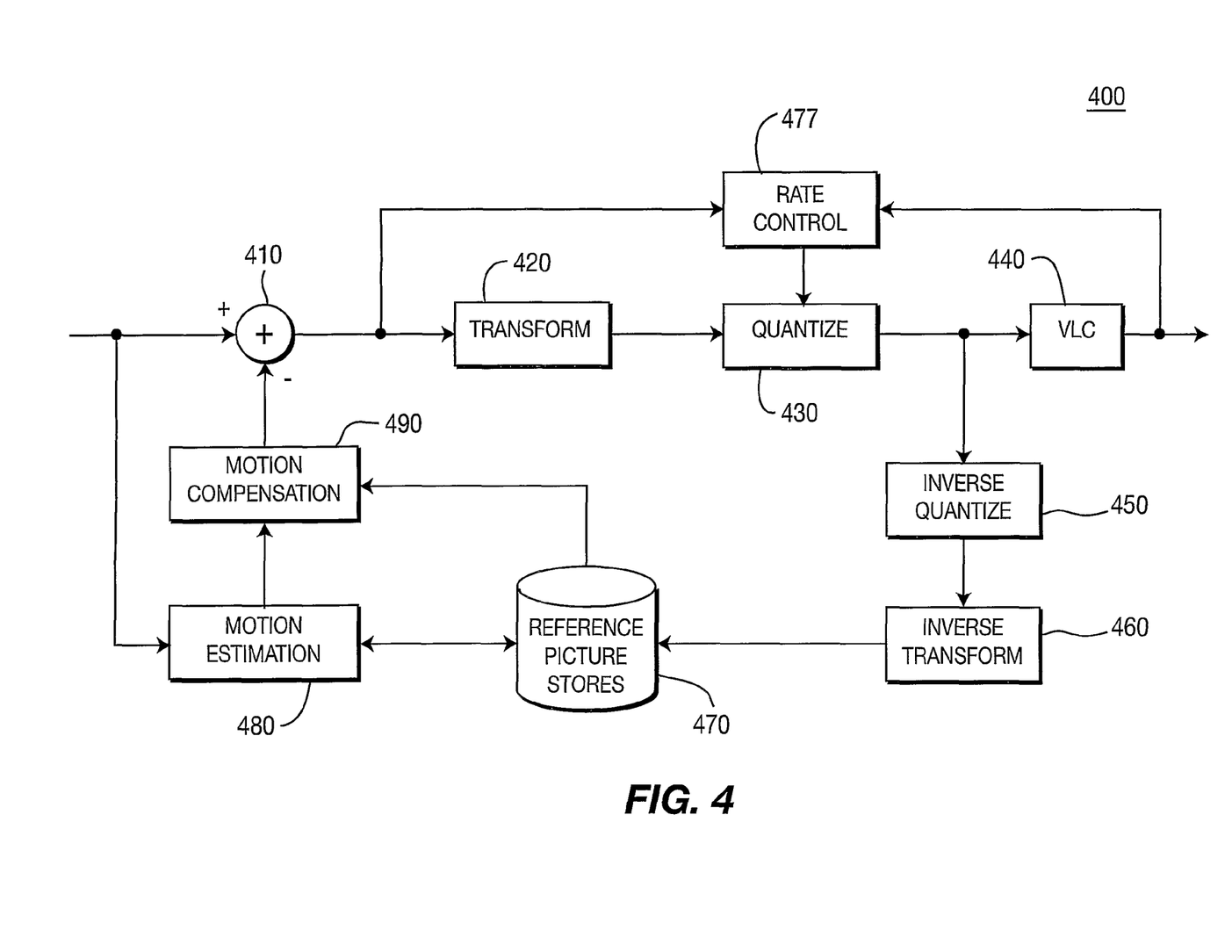
FIG. 4 shows a block diagram for an encoder in accordance with the principles of the present invention.

Turning to FIG. 4, an encoder for encoding video data is indicated generally by the reference numeral 400.

An input to the encoder 400 is connected in signal communication with a non-inverting input of a summing junction 410. The output of the summing junction 410 is connected in signal communication with a block transformer 420. The transformer 420 is connected in signal communication with a first input of a quantizer 430. The output of the quantizer 430 is connected in signal communication with a variable length coder ("VLC") 440, where the output of the VLC 440 is an externally available output of the encoder 400. A first input of a rate controller 477 is connected in signal communication with the output of the summing junction 410, a second input of the rate controller 477 is connected in signal communication with the output of the VLC 440, and an output of the rate controller 477 is connected in signal communication with a second input of the quantizer 430.

The output of the quantizer 430 is further connected in signal communication with an inverse quantizer 450. The inverse quantizer 450 is connected in signal communication with an inverse block transformer 460, which, in turn, is connected in signal communication with a reference picture store 470. A first output of the reference picture store 470 is connected in signal communication with a first input of a motion estimator 480. The input to the encoder 400 is further connected in signal communication with a second input of the motion estimator 480. The output of the motion estimator 480 is connected in signal communication with a first input of a motion compensator 490. A second output of the reference picture store 470 is connected in signal communication with a second input of the motion compensator 490. The output of the motion compensator 490 is connected in signal communication with an inverting input of the summing junction 410.

In the event that the encoder 400 is a transcoder or is used with a transcoder, then the transcoder may extract motion vectors from pre-coded bitstreams.

The approach employed in FIG. 5 will now be described generally, followed by a more detailed description thereof with respect to the method steps illustrated in FIG. 5.

SKIP mode and 16×16 mode are first tested. If the minimum distortion is below a threshold T1, or SKIP mode and 16×16 mode have the same motion vectors and 16×16 mode has no residual, then the mode search may be terminated immediately. Otherwise, homogeneity conditions are examined. If 16×16 mode is homogeneous, then only 8×16 mode or 16×8 mode may need to be tested depending on edge information (i.e., for vertical edges, test 8×16 mode; for horizontal edges, test 16×8 mode—otherwise, terminate mode decision). If 16×16 is not homogeneous, the 8×8 mode and, if applicable, the 16×8 mode and the 8×16 mode are also tested. If the minimum distortion is below a threshold T2, then the mode search may again be terminated and the mode with the minimum distortion may be selected as the best mode. Otherwise, for each 8×8 sub-partition, the homogeneity condition is again applied. If an 8×8 sub-partition is found to be homogeneous, then no additional mode search is needed. Otherwise, the 4×4 mode for the current sub-partition is also checked. Examining 8×4 and 4×8 sub-partitions can be decided based on thresholding parameters or the relationship of 4×4 mode with respect to 8×8 mode (i.e., if 4×4 MVs are different from 8×8 MVs). When all 8×8 sub-partitions are tested, the search of all modes can be terminated.

Figure 5:
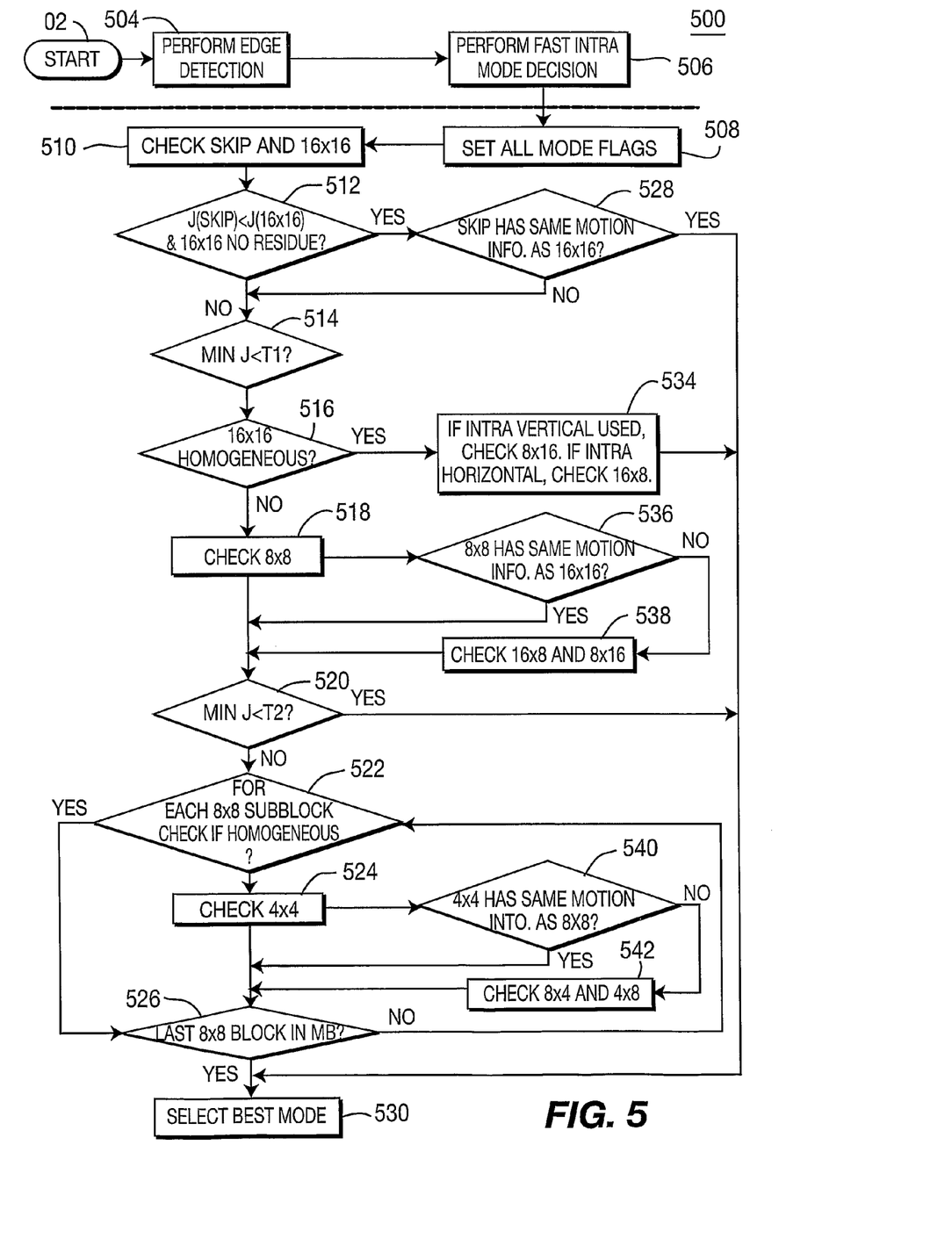
FIG. 5 shows a flow diagram for a method for mode decision in accordance with the principles of the present invention.

Turning to FIG. 5, a method for mode decision is generally indicated using the reference numeral 500. The method 500 includes a start block 502 that passes control to a function block 504. The function block 504 performs edge detection, and passes control to a function block 506. The function block 506 performs fast intra mode decision, and passes control to a function block 508. The function block 508 sets all mode flags, and passes control to a function block 510. The function block 510 checks SKIP mode and 16×16 mode, and passes control to a decision block 512. The decision block 512 determines, for a current (i.e., currently evaluated) 16×16 macroblock (MB), whether or not the distortion in SKIP mode, J(SKIP), is less than the distortion in 16×16 mode, J(16×16), and that 16×16 mode has no residue. If the distortion in SKIP mode is not less than the distortion in 16×16 mode and/or 16×16 mode has a residue, then control is passed to a decision block 514. Otherwise, if the distortion in SKIP mode is less than the distortion in 16×16 mode and 16×16 mode has no residue, then control is passed to a decision block 528.

The decision block 514 determines whether or not the minimum distortion (MinJ) is less than a pre-specified threshold T1. If MinJ is not less than T1, then control is passed to a decision block 516. Otherwise, if MinJ is less than T1, then control is passed to a function block 530.

The decision block 516 determines whether or not the 16×16 MB is homogenous. If the 16×16 MB is not homogenous, then control is passed to a function block 518. Otherwise, if the 16×16 MB is homogenous, then control is passed to a function block 534.

The function block 518 checks 8×8 mode for a current (i.e., currently evaluated) 8×8 sub-partition of the 16×16 MB, and passes control to a decision block 536 and also to a decision block 520.

The decision block 536 determines whether or not 8×8 mode has the same motion information as 16×16 mode for the current 8×8 sub-partition. If 8×8 mode does not have the same motion information as 16×16 mode for the current 8×8 sub-partition, then control is passed to a function block 538. Otherwise, if 8×8 mode has the same motion information as 16×16 mode for the current 8×8 sub-partition, then control is passed to decision block 520.

The function block 538 checks the 16×8 and 8×16 sub-partitions, and passes control to decision block 520.

The decision block 520 determines whether or not the minimum distortion (MinJ) is less than a pre-specified threshold T2. If MinJ is not less than T2, then control is passes to a decision block 522. Otherwise, if MinJ is less than T2, then control is passes to function block 530.

The decision block 522 determines, for each 8×8 sub-partition of the 16×16 MB, whether that 8×8 sub-partition is homogenous. If a current 8×8 sub-partition is not homogenous, then control passes to a function block 524. Otherwise, if the current 8×8 sub-partition is homogenous, then control passes to a function block 526.

The function block 524 checks 4×4 mode for a current 4×4 sub-partition of the 16×16 MB, and passes control to a decision block 540 and also to a decision block 526.

The decision block 540 determines whether or not 4×4 mode has the same motion information as 8×8 mode for the current 4×4 sub-partition. If 4×4 mode does not have the same motion information as 8×8 mode for the subject 4×4 sub-partition, then control is passed to a function block 542. Otherwise, if 4×4 mode has the same motion information as 8×8 mode for the current 4×4 sub-partition, then control is passed to decision block 526.

The decision block 526 determines whether or not the current 8×8 sub-partition is the last 8×8 sub-partition included in the 16×16 MB. If the current 8×8 sub-partition is not the last 8×8 sub-partition included in the 16×16 MB, then control is passed to decision block 522. Otherwise, if the subject 8×8 sub-partition is the last 8×8 sub-partition included in the 16×16 MB, then control is passed to a function block 530.

The decision block 528 determines whether or not SKIP mode has the same motion information as 16×16 mode for the 16×16 MB. If SKIP mode does not have the same motion information as 16×16 mode for the 16×16 MB, then control is passed to decision block 514. Otherwise, if SKIP mode has the same motion information as 16×16 mode for the 16×16 MB, then control is passed to function 530.

The function block 534 checks 8×16 when intra vertical is used and checks 16×8 when intra horizontal is used, and passes control to function block 530.

The function block 542 checks the 8×4 and 4×8 sub-partitions, and passes control to decision block 526.

The function block 530 selects the best mode from among the evaluated modes, and passes control to an end block 532. The end block 532 ends the macroblock encoding.

The above scheme may also be readily varied to include the additional conventional parameters relating to distortion and relationships between modes, that is to consider additional distortion based thresholds and adapt such thresholds based on previously computed blocks or macroblocks, etc., and further and extending beyond the preceding, to consider mode motion vector (MV) correlation.

One characteristic of the conventional approach that uses homogeneity analysis and stationarity detection that was not discussed above was the consideration of zero motion within a partition. This concept could be rather beneficial in determining backgrounds or in general stationary regions, nevertheless it may not be as useful if an image is characterized by significant global motion. Considering that several encoders may also include a preprocessing element that already employs a preliminary, usually 16×16, ME or are even based on transcoding architectures (e.g., source input is in a different format A such as MPEG-2 which is decoded and then re-encoded to format B), it is disclosed herein that if such element is available instead of considering zero motion the new motion vector from this element may be used instead. More specifically, an additional condition is added after checking modes 16×16 and SKIP, according to which if $|MV_{BestMode} - MV_{PredMV}| < \epsilon$ and MinJ<T3, where BestMode is the mode with the minimum distortion MinJ, PredMV the preprocessing element MV, while $\epsilon$ and T3 are predefined thresholds, search is terminated once again. A similar condition could also apply for testing 8×8 sub-partitions, since this approach may be used to determine region homogeneity based on motion information.

A description will now be given of some of the many attendant advantages/features of the present invention. For example, one advantage/feature is an encoder that performs mode decision by initially performing motion estimation only for a subset of possible block sizes and then uses the motion information, and also additional analysis characteristics, to determine if other block sizes should be examined. Another advantage/feature is an encoder as described above, wherein the analysis characteristics are based on homogeneity analysis. Yet another advantage/feature is an encoder as described above, wherein thresholding criteria are also introduced to terminate the search. Still another advantage/feature is an encoder as described above, wherein the analysis characteristics are based on homogeneity analysis as described above, and wherein the encoder includes a preprocessing element that uses precomputed MV to enhance the homogeneity analysis. A further advantage is an encoder as described above, wherein the analysis characteristics are based on homogeneity analysis as described above, and wherein block error surface is used combined with homogeneity conditions to decide which block partitions to be examined.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus for encoding video data for an image block, comprising:
    an encoder for performing a mode decision by performing initial motion estimation on only a subset of possible block sizes to output motion information corresponding thereto, and determining, based upon the motion information corresponding to only the subset of possible of block sizes and upon other image-related analysis data, whether other block sizes are to be evaluated,
    wherein the image-related analysis data is an error surface monotonicity.

2. The apparatus according to claim 1, wherein the image-related analysis data is based upon a homogeneity analysis.

3. The apparatus according to claim 1, wherein said encoder is a transcoder that extracts motion vectors for the image block from pre-coded bitstreams.

4. The apparatus according to claim 1, wherein the subset of possible block sizes consists of a SKIP mode and a 16×16 mode.

5. The apparatus according to claim 1, wherein said determining step comprises evaluating whether or not a distortion in a SKIP mode is less than a distortion in a 16×16 mode and that the 16×16 mode has no residue.

6. The apparatus according to claim 2, wherein said encoder includes a preprocessing element for precomputing motion vectors to enhance the homogeneity analysis.

7. The apparatus according to claim 2, wherein the other image-related analysis data is further based upon block error surface and is combined with the homogeneity analysis data.

8. A method for encoding video data of an image block comprising the steps of:
    performing a mode decision by determining initial motion estimation on only a subset of possible block sizes to output motion information corresponding thereto; and
    determining, based upon the motion information corresponding to only the subset of possible of block sizes and upon other image-related analysis data, whether other block sizes are evaluated,
    wherein the subset of possible block sizes consists of a SKIP mode and a 16×16 mode.

9. The method according to claim 8, wherein the image-related analysis data is based upon a homogeneity analysis.

10. The method according to claim 8, wherein said method is performed by a transcoder, and further comprises the step of extracting motion vectors for the image block from pre-coded bitstreams.

11. The method according to claim 8, wherein said determining step comprises evaluating whether or not a distortion in the SKIP mode is less than a distortion in the 16×16 mode and that the 16×16 mode has no residue.

12. The method according to claim 8, wherein said determining step comprises evaluating whether or not a distortion in a SKIP mode is less than a distortion in a 16×16 mode and that the 16×16 mode has no residue.

13. The method according to claim 8, wherein the image-related analysis data is an error surface monotonicity.

14. The method according to claim 9, further comprising a preprocessing step for precomputing motion vectors to enhance the homogeneity analysis.

15. The method according to claim 9, wherein the other image-related analysis data is further based upon block error surface and is combined with the homogeneity analysis data.

16. An apparatus for encoding video data of an image block comprising:
    means for performing a mode decision; and
    means for determining, based upon the motion information corresponding to only the subset of possible of block sizes and upon other image-related analysis data, whether other block sizes are evaluated,
    wherein the mode decision is performed by determining initial motion estimation on only a subset of possible block sizes to output motion information corresponding thereto, wherein said means for determining evaluates whether or not a distortion in a SKIP mode is less than a distortion in a 16×16 mode and that the 16×16 mode has no residue.

17. The apparatus according to claim 16, wherein the subset of possible block sizes consists of the SKIP mode and the 16×16 mode.

18. The method according to claim 11, wherein said determining step further comprises determining whether or not the motion information for the SKIP mode and the motion information for the 16×16 mode are the same.

19. The apparatus according to claim 4, wherein said determining step comprises evaluating whether or not a distortion in the SKIP mode is less than a distortion in the 16×16 mode and that the 16×16 mode has no residue.

20. The apparatus according to claim 19, wherein said determining step further comprises determining whether or not the motion information for the SKIP mode and the motion information for the 16×16 mode are the same.

21. The apparatus according to claim 17, wherein said determining step further comprises determining whether or not the motion information for the SKIP mode and the motion information for the 16×16 mode are the same.

* * * * *